E. FINELLI.
FENDER FOR VEHICLES.
APPLICATION FILED JULY 22, 1919.

1,326,487.

Patented Dec. 30, 1919.
2 SHEETS—SHEET 1.

Inventor
Ernesto Finelli
by his atty
Samuel E. Darby

E. FINELLI.
FENDER FOR VEHICLES.
APPLICATION FILED JULY 22, 1919.
1,326,487.
Patented Dec. 30, 1919.
2 SHEETS—SHEET 2.
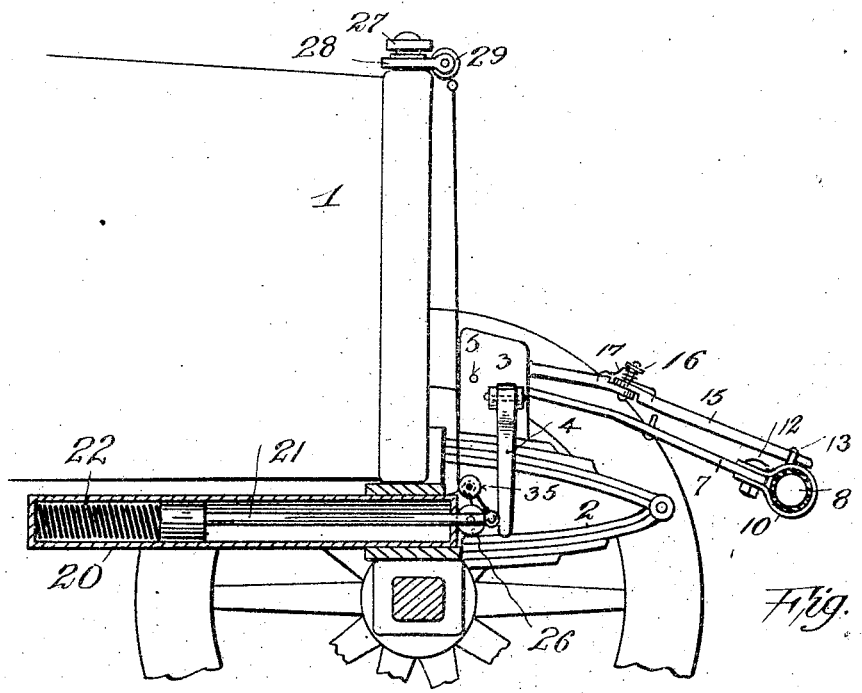
Fig. 3
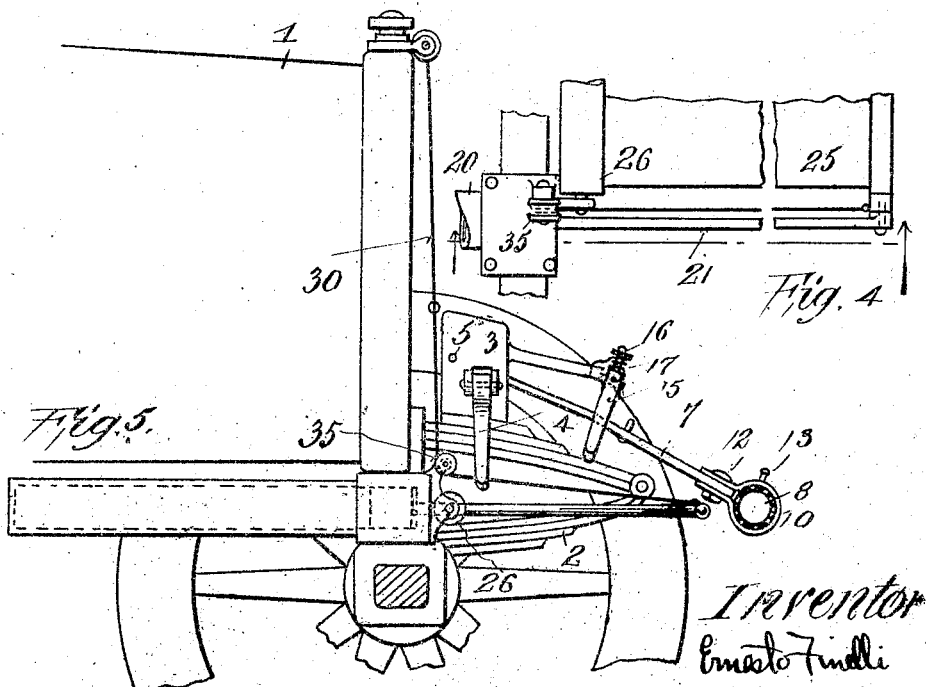
Fig. 4
Fig. 5
Inventor
Ernesto Finelli
by his atty Samuel T. Darby

UNITED STATES PATENT OFFICE.

ERNESTO FINELLI, OF NEW YORK, N. Y.

FENDER FOR VEHICLES.

1,326,487.     Specification of Letters Patent.     Patented Dec. 30, 1919.

Application filed July 22, 1919. Serial No. 312,493.

*To all whom it may concern:*

Be it known that I, ERNESTO FINELLI, a subject of the King of Italy, and resident of New York, county and State of New York, have made a certain new and useful Invention in Fenders for Vehicles, of which the following is a specification.

This invention relates to fenders for vehicles, and particularly for automobiles.

The object of the invention is to provide a fender which is simple in construction, efficient in operation and economical of manufacture.

A further object of the invention is to provide a fender for vehicles which will prevent injury to pedestrians struck by the vehicle while in motion.

A further object of the invention is to provide a device of the character described wherein provision is made to form a shock absorbing curtain to catch a pedestrian struck by a vehicle, which curtain is not positioned in place until the pedestrian is struck, and which automatically operates upon striking the pedestrian.

A further object of the invention is to provide in a device of the character described means for holding the pedestrian so struck by the vehicle to prevent him from rebounding, rolling or falling in front of the vehicle after being initially struck thereby.

Further objects of the invention will appear more fully hereinafter.

The invention consists substantially in the construction, combination, location and relative arrangement of parts, all as will be more fully hereinafter set forth, as shown by the accompanying drawings, and finally pointed out in the appended claims.

Referring to the drawings:

Fig. 3 is a view in side elevation of a portion of the vehicle showing one position of the fender and safety device.

Fig. 4 is a top plan view of a portion of the same showing the curtain extended.

Fig. 5 is a view similar to Fig. 3, showing the device in its operated or actuated position.

The same part is designated by the same reference character wherever it occurs throughout the several views.

In accordance with my invention I propose to provide a fender for vehicles which upon striking a pedestrian will cause a curtain to rise vertically and project horizontally to catch the pedestrian so struck and to simultaneously actuate two arms to support the body of the person thus in effect picked up by the vehicle and prevent him from falling. While I have shown and will now describe my invention as applied particularly to automobiles, I wish it to be understood that the same is not to be limited or restricted in this respect as the same is applicable for any vehicle.

Figure 1:
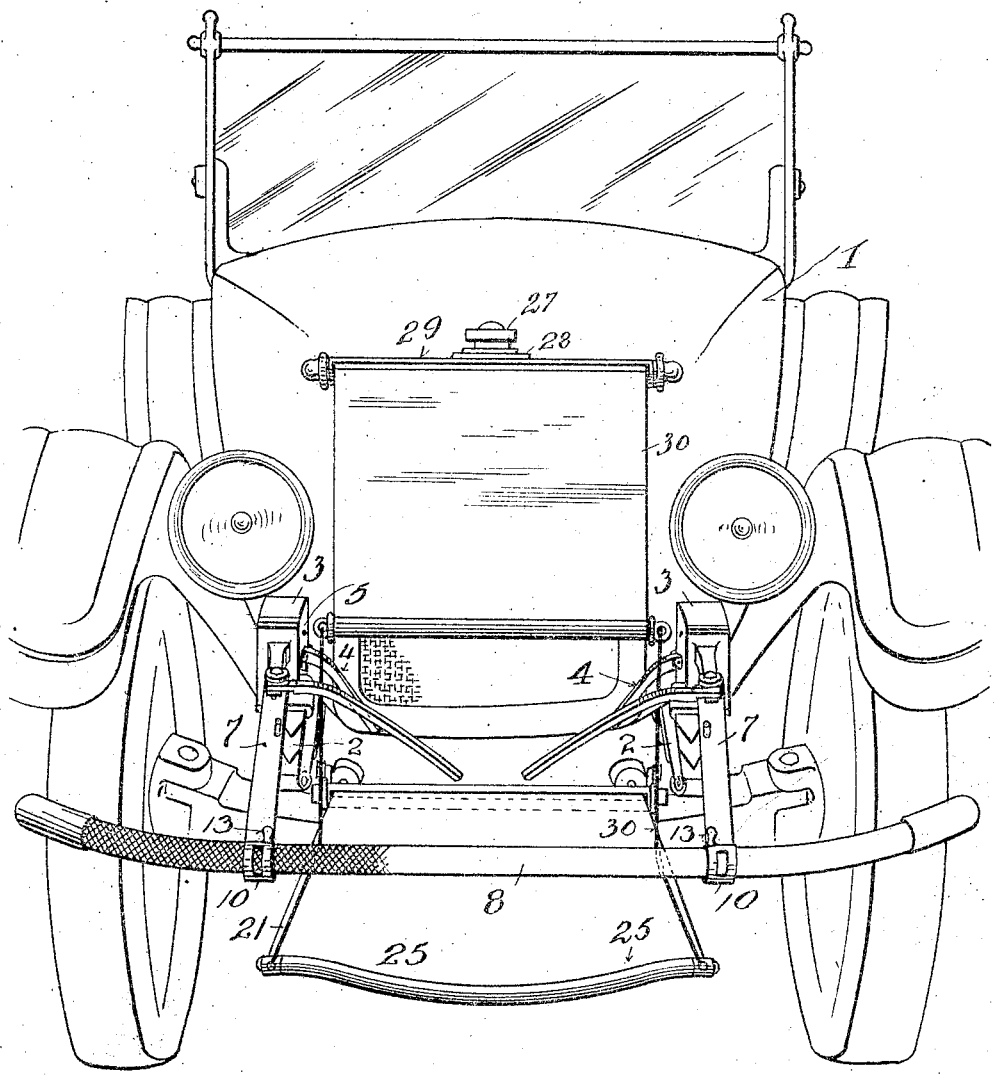
Figure 1 is a view in front elevation of a vehicle equipped with a fender embodying my invention.
Figure 2:
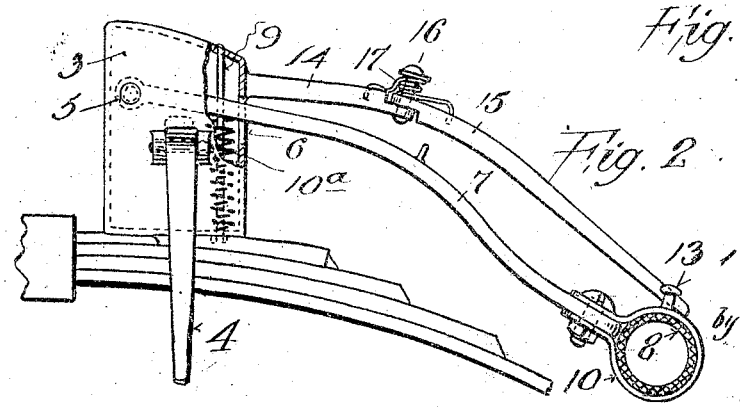
Fig. 2 is a detail view in side elevation of one member of the fender and safety device forming a part thereof.

Referring to the drawings, I show in Fig. 1 a front view of an automobile, upon the respective front springs 2 of which I mount a housing 3, which may be made in any suitable manner, preferably of metal. Pivotally supported on the inner side of the housing 3 is an arm 4. Pivotally supported as at 5 in the housing 3 and extended through a door 6 in the front edge thereof is an arm 7 which has pivotally secured at the end thereof a fender 8 which may be of any suitable construction, preferably of the usual well known partially curved form and made of flexible material possessing resiliency but at the same time strength, for example, heavy mesh wire, and preferably round in contour, so as to eliminate projecting edges. Extending between the top and bottom of the housing 3 and located at the front end thereof is a rod 9, which extends through a hole in the arm 7, a spring 10 being coiled around the arm and positioned between the bottom of the housing 3 and the undersurface of the arm 7. The arm 7 supports the fender 8 by means of a collar 10 carried on the fender 8, which collar is secured to the end of the arm 7, in any suitable manner, for example, by means of a screw or bolt. The collar 10 is provided with an upwardly projecting pin 13. Rigidly attached to the case 3 or forming a part thereof is an arm 14 positioned above the pivoted arm 7. This arm 14 is pivotally secured to a movable arm 15 by means of a bolt connection 16 and a spring 17 coiled about the bolt 16 and secured to the respective arms 14 and 15 which normally tends to turn the movable arm 15 inwardly. The arm 15 is of such length that the same may be positioned behind the pin 13 on the collar 10 and held in this position against the action of the spring as clearly shown in Fig. 2. One end of the arm 4 mounted on the inner surface of the case 3 is bent at substantially right angles thereto and projects within the case 3 so that the arm 4 is rocked when the arm 7 is depressed against the action of the spring 10$^a$.

Referring to Fig. 3, mounted under the hood of the vehicle is a cylinder 20, in which is mounted a plunger 21, the free end of which is normally in alinement with the arm 4. A spring 22 normally urges the plunger in a forwardly direction relative to the car. The end of the plunger 21 is secured to the pole of a curtain 25 mounted on a roll 26 of the usual spring type whereby when the arm 4 is removed from the position in front of the plunger 21 the spring 22 causes plunger 21 to be projected forwardly and thus unwinding the curtain 25 in a horizontal direction as will be apparent. Suitably secured to the top of the vehicle, or in this instance, to the radiator cap 27, by means of bracket 28 is a curtain roll 29, also of the spring type, to the edges of which are secured a string, wire or other connecting means 30, which is in turn secured to the end of the plunger 21. If desired, the string 30 may pass over the pulley 35 to, upon actuation of the plunger, cause the top of the curtain 29 to unroll vertically downward. The operation of the device will be apparent. Assuming the parts to be in the position shown in Figs. 2 and 3, that is, with the curtains rolled up on their rolls the arm 4 positioned in front of the end of the plunger 21 and the arms 15 maintained in place by means of the pins 13 on the collar 10, if a pedestrian is hit in the travel of the automobile the supporting arm 7 for the fender being pivotally mounted as above explained, the fender is depressed, the depression of the fender draws the pin 13 out of retaining engagement relative to the pivoted arm 15 so that the arm 15 is released and supports the pedestrian on the curtain. At the same time the downward movement of the fender 8 causes the arms 7 to bear against the projection of arms 4 which are located within the casings 3 and thereby rocks the arms 4 and thus release the plungers 21 so that the curtains are drawn into place in the manner above described.

It will of course be understood that while I have described the mechanism on one side of the vehicle, in the case of automobiles this mechanism will be duplicated for the other side of the vehicle, but the construction, mode of operation, and results shown and obtained would be coöperative and identical.

The advantages of a fender of this type and character are believed to be too obvious to require enumeration. Many modifications and changes will readily occur to those skilled in the art without departing from the spirit and scope of my invention as defined in the claims, therefore having set forth the objects and nature of my invention, and having shown and described constructions embodying the principles thereof, what I claim as new and useful and of my own invention and desire to secure by Letters Patent is,—

1. In a safety device for vehicle fronts, the combination with a vehicle frame, of a fender pivotally carried thereby, means for yieldingly maintaining said fender in its upward limit of pivotal movement, spring pressed arms normally tending to swing toward each other, means for retaining said arms in retracted position when said fender is in its normal position, and means for releasing said arms when pivotal movement is imparted to said fender.

2. The combination with a vehicle frame, of a casing supported thereby, a lever pivotally carried by said casing, means for normally maintaining said lever at its upward limit of movement, a fender carried by said lever, an arm rigidly extending from said casing and provided with a pivoted portion, means normally tending to swing the pivoted portion of said arm about its pivot, and means carried by said fender for retaining the position of said arm in alinement with said lever, whereby when said fender is depressed, said pivoted portion of said arm is released.

3. In a device of the character described, the combination with a curtain, means for projecting said curtain in a substantially horizontal direction, means for normally retaining said curtain in retracted position under tension, a second curtain, a fender, and means actuated by the fender being struck for extending said first mentioned curtain, and means actuated thereby for extending said second curtain in a vertical direction.

4. The combination with a frame, a pair of horizontally disposed curtain rolls supported thereby, one above the other, and spaced apart from each other, a fender, means actuated by movement of said fender for unrolling one of said curtains substantially horizontally, and the other of said curtains substantially vertically.

5. The combination with a frame, a fender pivotally supported thereby, means for yieldingly maintaining said fender at the upward limit of its pivotal movement, a tension arm, means for normally retaining said arm under tension, a curtain secured to the end of said arm, and means actuated by the pivotal movement of said fender for releasing said arm retaining means.

6. The combination with a frame, a fender pivotally supported thereby, means for yieldingly maintaining said fender at the upward limit of its pivotal movement, a pivoted lever, means normally tending to swing said lever about its pivot, means carried by said fender when in its normal position for retaining said lever in retracted position, a tension arm, means for normally retaining said arm under tension, a curtain secured to the end of said arm, and means actuated by the pivotal movement of said fender for releasing said arm retaining means.

7. The combination with a frame, a casing supported thereby, a fender pivotally supported in said casing, an arm pivotally mounted on said casing, and positioned to be pivotally rocked upon movement of said fender about its pivot, a spring pressed plunger bar normally retained in retracted position by said arm, and a curtain secured to said arm.

In testimony whereof I have hereunto set my hand on this 30th day of June, A. D. 1919.

ERNESTO FINELLI.